(No Model.) 2 Sheets—Sheet 1.
H. RIGBY & D. LINDSAY.
COMPOUND HARNESS FOR JACQUARD LOOMS.
No. 308,991. Patented Dec. 9, 1884.
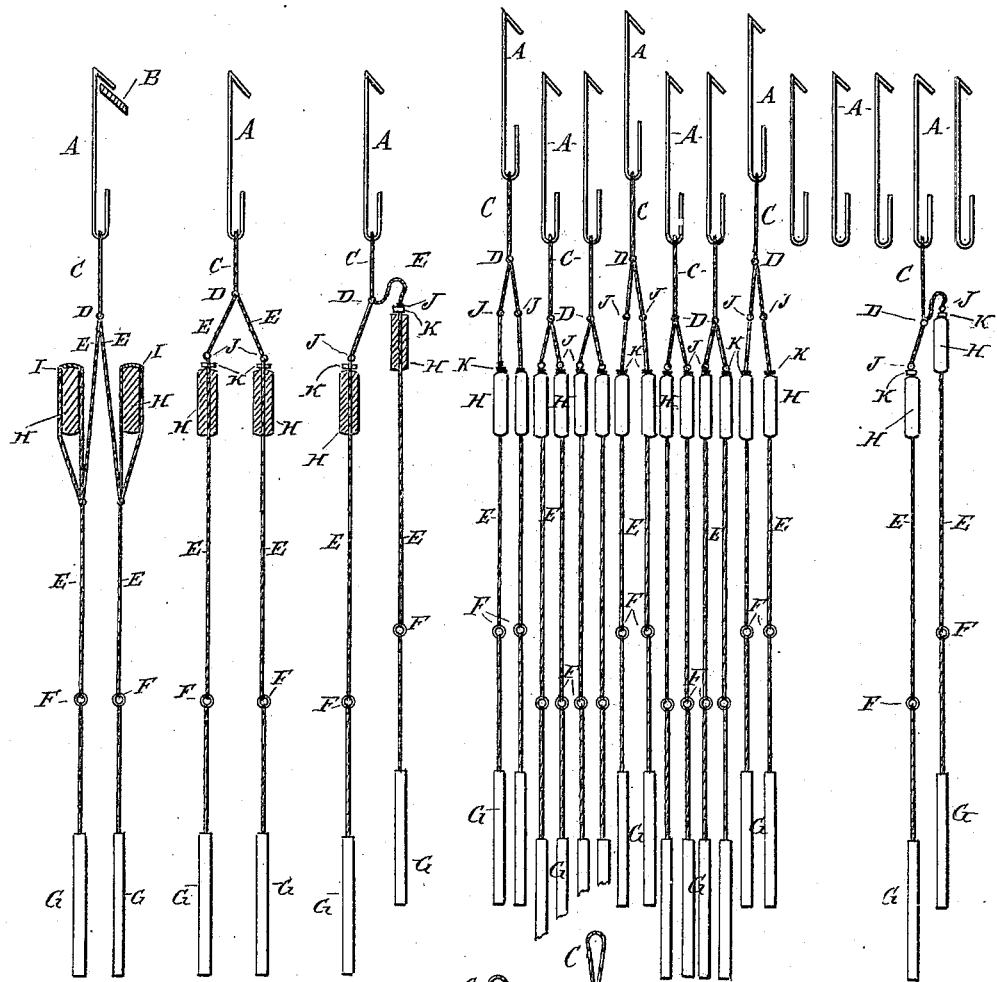
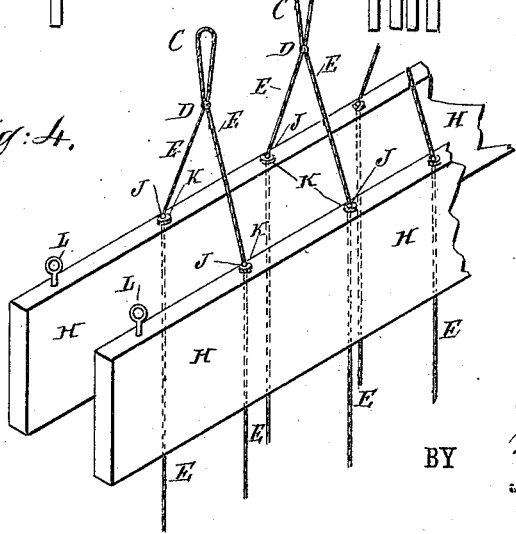
WITNESSES:
Chas. Niora
C. Sedgwick
INVENTOR:
H. Rigby
D. Lindsay
BY Munn & Co
ATTORNEYS.

(No Model.) 2 Sheets—Sheet 2.
H. RIGBY & D. LINDSAY.
COMPOUND HARNESS FOR JACQUARD LOOMS.
No. 308,991. Patented Dec. 9, 1884.
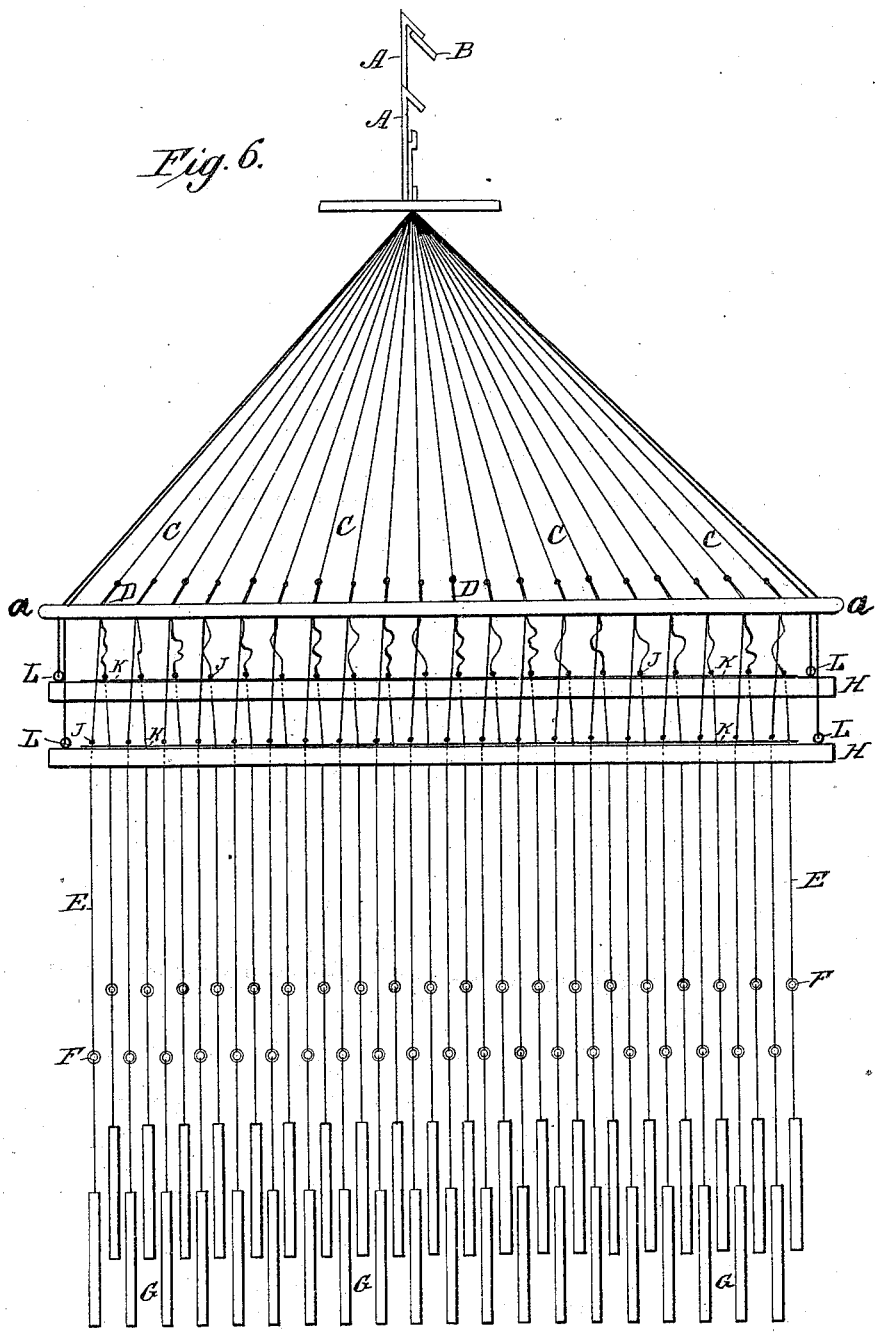
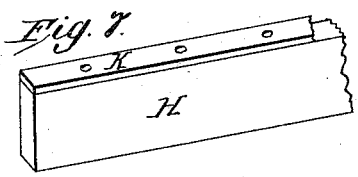

UNITED STATES PATENT OFFICE.

HOLDEN RIGBY AND DAVID LINDSAY, OF PATERSON, NEW JERSEY.

COMPOUND HARNESS FOR JACQUARD LOOMS.

SPECIFICATION forming part of Letters Patent No. 308,991, dated December 9, 1884.

Application filed January 12, 1884. (No model.)

*To all whom it may concern:*

Be it known that we, HOLDEN RIGBY and DAVID LINDSAY, of Paterson, in the county of Passaic and State of New Jersey, have invented a new and useful Improvement in Compound Harness for Jacquard Looms, of which the following is a full, clear, and exact description.

Reference is to be had to the accompanying drawings, forming a part of this specification, in which similar letters of reference indicate corresponding parts in all the figures.

Figure 1 represents a single Jacquard hook and its connections, illustrating the ordinary construction of compound harness, the two lifting-shafts being shown in section. Fig. 2 represents a single hook and its connections, illustrating our improvement, the two lifting-shafts being shown in section. Fig. 3 is a view showing the same features as Fig. 2, but showing one of the shafts raised. Fig. 4 is a perspective view showing the double harnesses of three neck-cords connected with parts of two lifting-shafts in accordance with our improvement. Fig. 5 represents a number of hooks and their connections, showing three hooks and one shaft raised. Fig. 6 is a front elevation of a portion of a compound harness for Jacquard looms embodying our improvement. Fig. 7 is a detail perspective view showing a modification.

The object of this invention is to promote durability in compound harnesses for Jacquard looms.

The invention consists in the peculiar construction and combination of parts, as hereinafter fully described, and pointed out in the claim.

A represents the hooks, and B one of the knives of the griff-frame that raise the said hooks. C are the neck-cords, and D are the knots where the harnesses E are connected with the said neck-cords C. F are the eyes through which the warp-threads pass, and G are the weights that help to bring down the harnesses and warp-threads after a shed has been formed and the shuttle has passed through it.

The griff-frame, the needles, the pattern-cards and prism, and the mechanism for operating the griff and prism may be of any usual and well-known construction—such, for instance, as that shown in the patent of F. M. Wolf, granted September 13, 1864, No. 44,271.

The drawings represent a compound harness in which two harnesses, E, before passing through the comber-board *a*, are connected with one neck-cord, C, so that the two harnesses will be raised by the rise of each hook A. The comber-board is omitted in Figs. 1 to 5 for the sake of clearness. To allow these two harnesses to be raised separately each harness E is connected with a shaft, H, which is provided with eye-screws L, for connecting it with the cords leading to the hooks by which the said shaft is raised, as shown in Fig. 6.

The ordinary manner of connecting the shafts H with the harnesses E is to attach loops I to the said harnesses, and pass the said shaft H through the said loops I, as illustrated in Fig. 1. With this construction the constant friction of the shafts H upon the loops I and harnesses E very soon wears the said loops and harnesses, making a continuous repairing necessary, and very soon destroying the harness. To prevent this wear and the consequent delay and loss we perforate the shafts H and pass the cords of the harnesses E through the said perforations, as shown in Figs. 2, 3, 4, 5, and 6. In this case knots J are formed in the harnesses E above the shafts H for the upper edges of the said shafts to strike against, so that the upward movement of the said shafts will raise the said harnesses.

To prevent the edges of the shafts H from wearing the knots J, and to lessen the jar when the said shafts in rising come in contact with the said knots, rubber washers K, as shown in Figs. 2, 3, 4, and 5, are placed upon the upper edges of the said shafts or attached to the cords of the harness. The cords of the harness pass through the washers, so that they will be between the knots J and the shafts H.

The washers K may be made in the form of rings, one for each cord passing through the shafts H, as shown in Figs. 2, 3, 4, and 5; or the washers K may be made in the form of long strips laid upon the upper edges of the shafts H, and perforated to correspond with the perforations of the said shafts, for the passage of the harness-cords, as shown in Figs. 6 and 7.

Having thus described our invention, we claim as new and desire to secure by Letters Patent—

The combination, with the hooks A, the neck-cords C, the harnesses E, provided with the knots J, the perforated shafts H, and cords for connecting the shafts to the hooks, of the rubber washers K, substantially as herein shown and described, whereby the said shafts are kept from wearing the said knots, as set forth.

HOLDEN RIGBY.
DAVID LINDSAY.

Witnesses:
JOHN C. SHERRATT,
JOSIAH WEST.